United States Patent [19]
Vos

[11] Patent Number: 5,117,157
[45] Date of Patent: May 26, 1992

[54] BALLAST CIRCUITS FOR DISCHARGE LAMPS

[75] Inventor: Raymond A. Vos, Enfield, England

[73] Assignee: Thorn EMI plc, London, England

[21] Appl. No.: 508,733

[22] Filed: Apr. 16, 1990

[30] Foreign Application Priority Data

Apr. 14, 1989 [GB] United Kingdom ............... 8908544

[51] Int. Cl.[5] ........................................ H05B 37/00
[52] U.S. Cl. .................................. 315/173; 315/205; 315/227 R; 363/21
[58] Field of Search ................. 315/173, 205, 227 R; 363/37, 21

[56] References Cited

U.S. PATENT DOCUMENTS

| | | | |
|---|---|---|---|
| 4,004,187 | 1/1977 | Walker | 315/205 |
| 4,259,614 | 5/1981 | Kohler | 315/219 |
| 4,553,070 | 11/1985 | Sairanen et al. | 315/209 R |
| 4,884,180 | 11/1989 | Hoffmann | 363/21 |
| 4,949,016 | 8/1990 | De Bijl et al. | 315/208 |

*Primary Examiner*—Eugene R. LaRoche
*Assistant Examiner*—Son Dinh
*Attorney, Agent, or Firm*—Fleit, Jacobson, Cohn, Price, Holman & Stern

[57] ABSTRACT

A ballast circuit for the operation of a discharge lamp includes a bridge rectifier. A capacitive energy storage device and a load circuit are connected in series across the bridge rectifier. A charge circuit provides charge to the capacitive energy storage from the load circuit in a potential so as to add to the potential from the outlet of the bridge rectifier.

14 Claims, 4 Drawing Sheets

BALLAST CIRCUITS FOR DISCHARGE LAMPS

This invention relates to ballast circuits for discharge lamps. In particular the invention relates to ballast circuits for driving discharge lamps at a high frequency whilst presenting a substantially resistive load to an alternating voltage supply at a lower frequency, for example a 50 Hz mains supply.

In order to maintain a lamp in a conductive state it is necessary to maintain a minimum level of current flowing in the lamp. Usually this is achieved by using an energy storage device which provides a source of power as the supply voltage falls to zero. The storage device is usually a capacitor which is charged from the rectified mains supply. Such an arrangement however gives rise to a large degree of input current harmonic distortion. Switching techniques for overcoming this distortion are described in European Patent No. 50131 and GB Patent No. 2124042. In both cases a storage capacitor, whose voltage is maintained above the supply voltage, is placed in parallel with the output of the rectifier. Such an arrangement suffers the disadvantage however that a high inrush current will occur at initial switch on and that significant costs and energy losses are associated with the switching circuitry.

It is an object of the present invention to provide an alternative ballast circuit for gas discharge lamps which substantially reduces the in-rush current and improves the harmonic content of the waveform.

According to the present invention there is provided a ballast circuit for the operation of a discharge lamp comprising:
means for deriving a rectified AC voltage from a source of AC supply; a capacitive energy storage device and a load circuit in series across said source of rectified AC supply voltage;
and means for providing charge to the capacitive energy storage device from the load circuit in a potential so as to add to the potential from the output of said source of rectified AC supply voltage.

In a circuit provided in accordance with the present invention, there is no direct path from the means for deriving a rectified AC voltage for charging the capacitive energy storage device because the capacitive energy storage device is in series with, not in parallel across, the load circuit. Accordingly, the present invention reduces the in-rush current which would otherwise be produced when the circuit is first connected to the supply.

The provision of a unidirectional device in parallel with the capacitive energy storage device prevents charging of the capacitive energy storage device in a direction so as to oppose the output voltage of said means for deriving a rectified AC voltage.

A particularly advantageous embodiment of the present invention further comprises means for providing a first current path, including a current source, between the capacitive energy storage device and the load circuit, the current path bypassing the means for deriving a rectified AC voltage when the current drawn from the rectified supply approaches zero. Accordingly, the circuit may be operated so as to draw a current from the supply which is substantially proportional to the supply voltage and so the problem of input current harmonic distortion is alleviated.

Ballast circuits in accordance with the invention will now be described, by way of example only, with reference to the accompanying figures in which.

Figure 1A:
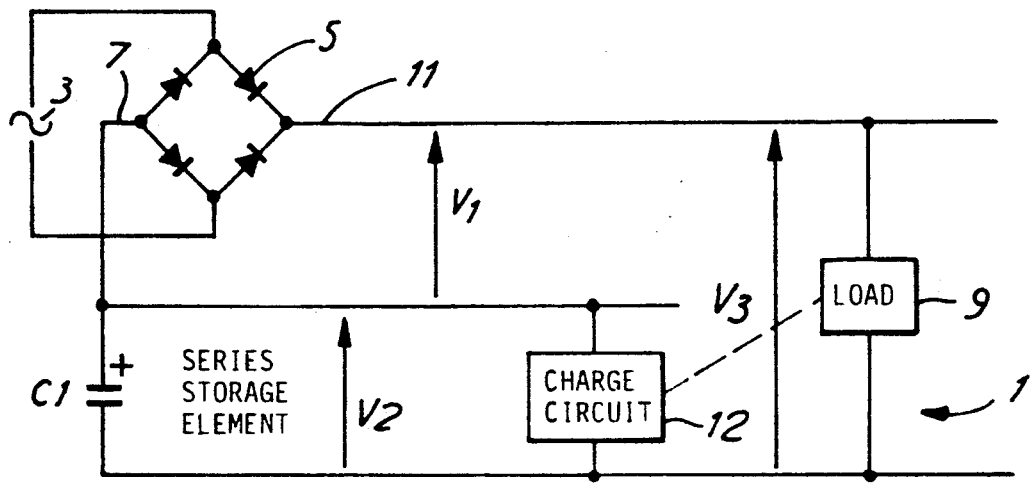
FIGS. 1a, 1b, 1c and 1d are schematic circuit diagrams of part of ballast circuits illustrating the principle of the invention.

Referring firstly to FIG. 1a, a rectified supply for the ballast circuit, indicated generally as 1, is derived from an AC supply 3 via a full wave diode bridge rectifier 5. Connected in series in the negative supply rail 7 of the rectifier 5 there is a series storage capacitor C1. A load indicated schematically as 9, including a discharge lamp (not shown) is connected via additional circuitry (not shown) to the negative supply rail 7 via the capacitor C1 and to the positive supply rail 11. The potential across the capacitor C1 is maintained at a minimum value by a charge circuit, shown schematically at 12, which takes energy from the load 9 (shown schematically by the dotted line). This minimum potential across the capacitor enables a minimum level of current to flow int he load.

Figure 1B:
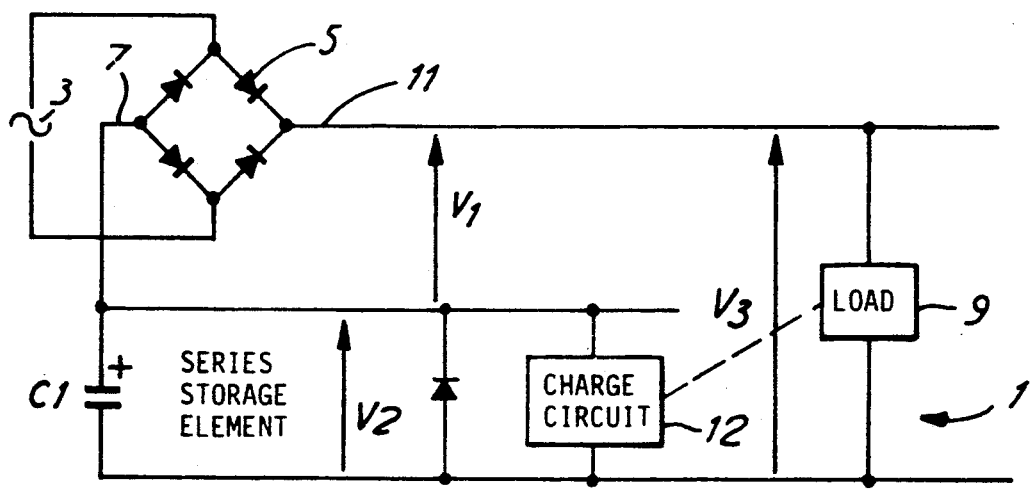

Thus in use of the circuit a voltage V2 will be generated across capacitor C1 such the voltage V3 across the load 9 will be the sum of the rectifier output voltage V1 and the capacitor voltage V2. As V1 falls to zero with the supply voltage the load voltage V3 will fall to V2. Thus a minimum voltage V2 is maintained across the load 9. A diode D1 can be provided across the capacitor C1 as shown in FIG. 1b. This prevents the capacitor C1 charging in a direction so as to oppose the output voltage of the bridge rectifier 5.

Figure 1C:
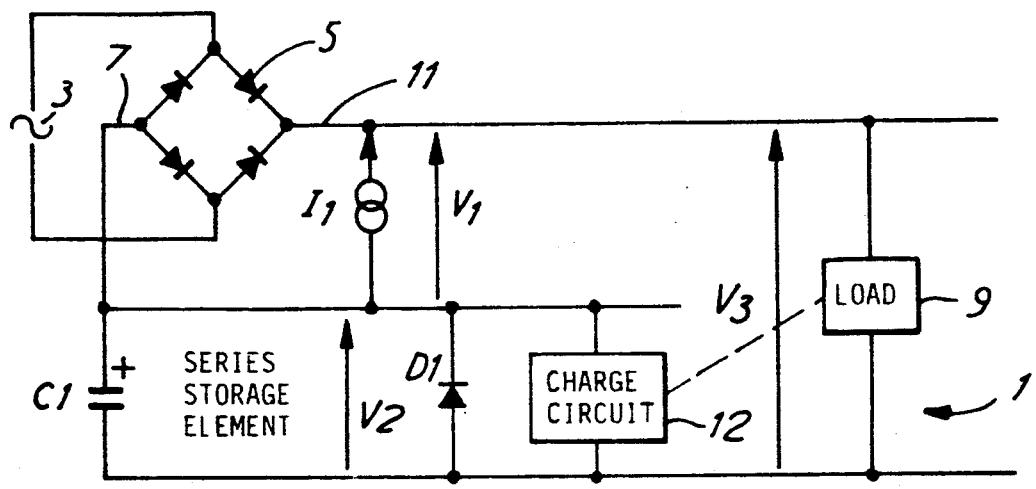
Figure 1D:
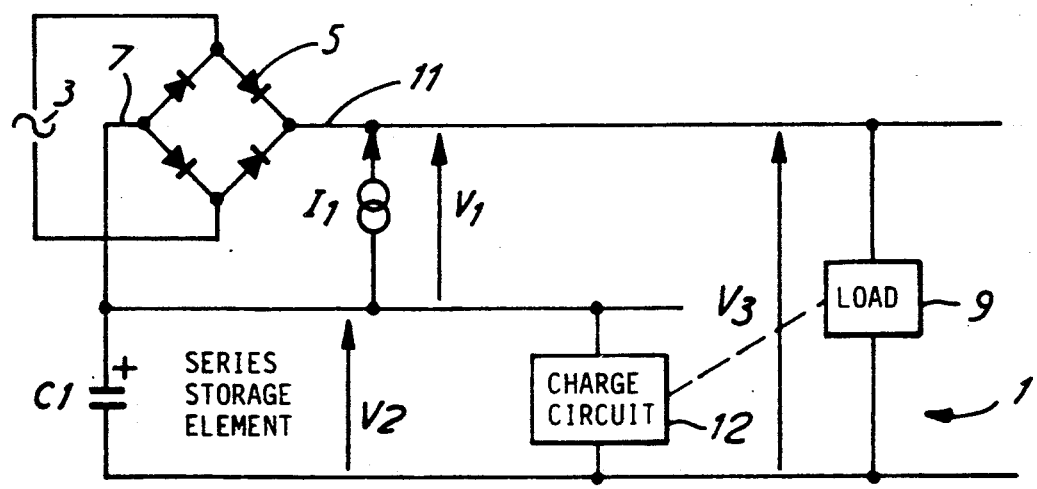

A suitable current source I1 may be provided, as shown in FIGS. 1c and 1d between the capacitor C1 and the positive rail 11, which is available as V1 falls to zero. This enables a bypass current to flow from C1 into the load 9 without flowing via the rectifier 5 when the supply voltage waveform passes through zero.

Figure 2A:
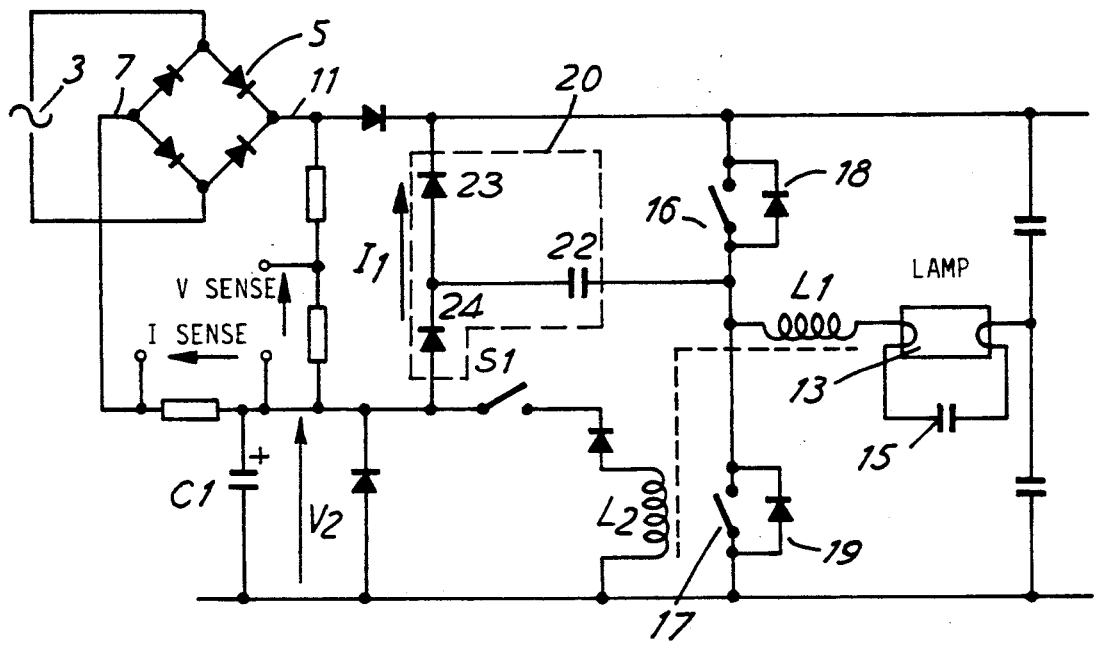
FIGS. 2a and 2b are schematic circuit diagrams of a ballast circuit in accordance with the invention.
Figure 2B:
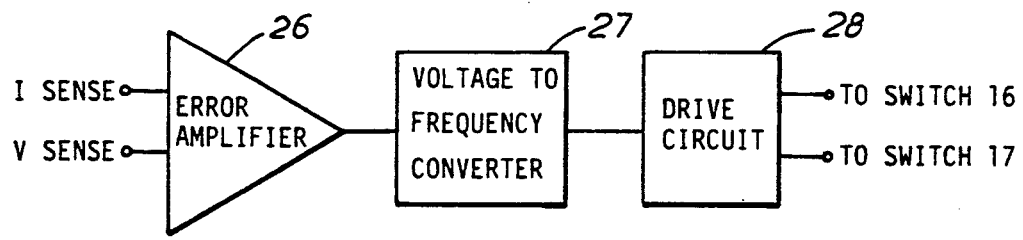

Referring now to FIG. 2a, in which corresponding features to those of FIG. 1 are correspondingly labelled, a load comprising a fluorescent lamp 13 and a capacitor 15 connected across the terminals of the lamp is driven by a high frequency inverter circuit shown schematically as switches 16, 17 with respective parallel diodes 18, 19. The inverter circuit is such that the total impedance of the ballast circuit may be controlled by varying the inverter drive frequency. A ballasting inductor L1 forms a series resonant circuit with the lamp 13 and capacitor 15. The storage capacitor voltage V2 is generated by a charge circuit comprising a secondary winding L2 of the ballasting inductor L1. Switch S1 is used to control the charging of the capacitor C1 e.g. by switching L2 out until the lamp 13 has been struck. The bypass current I1 is provided by a charge pump circuit 20 comprising capacitor 22 and diodes 23, 24. This charge pump circuit operates from the freewheel current of the inverter 16, 17, 18, 19. Vsense and Isense represent respectively supply voltage sensing and current sensing means. A feedback circuit 25, shown schematically in FIG. 2b, is employed to control the inverter frequency such the current sensed by Isense is proportional to the voltage sensed by Vsense such that a resistive load is presented to the supply. The feedback circuit 25 shown in FIG. 2b consists of an error amplifier 26, a voltage to frequency converter 27 and a drive circuit 28 for the switches 16, 17. The output of the error amplifier is zero when the instantaneous current sensed by Isense is proportional to the instantaneous voltage sensed by Vsense. The output of the error amplifier 26 determines the frequency generated by the voltage to frequency generator 27 and hence the frequency at which the switches 16, 17 will be switched by the drive circuit 28.

Figure 3:
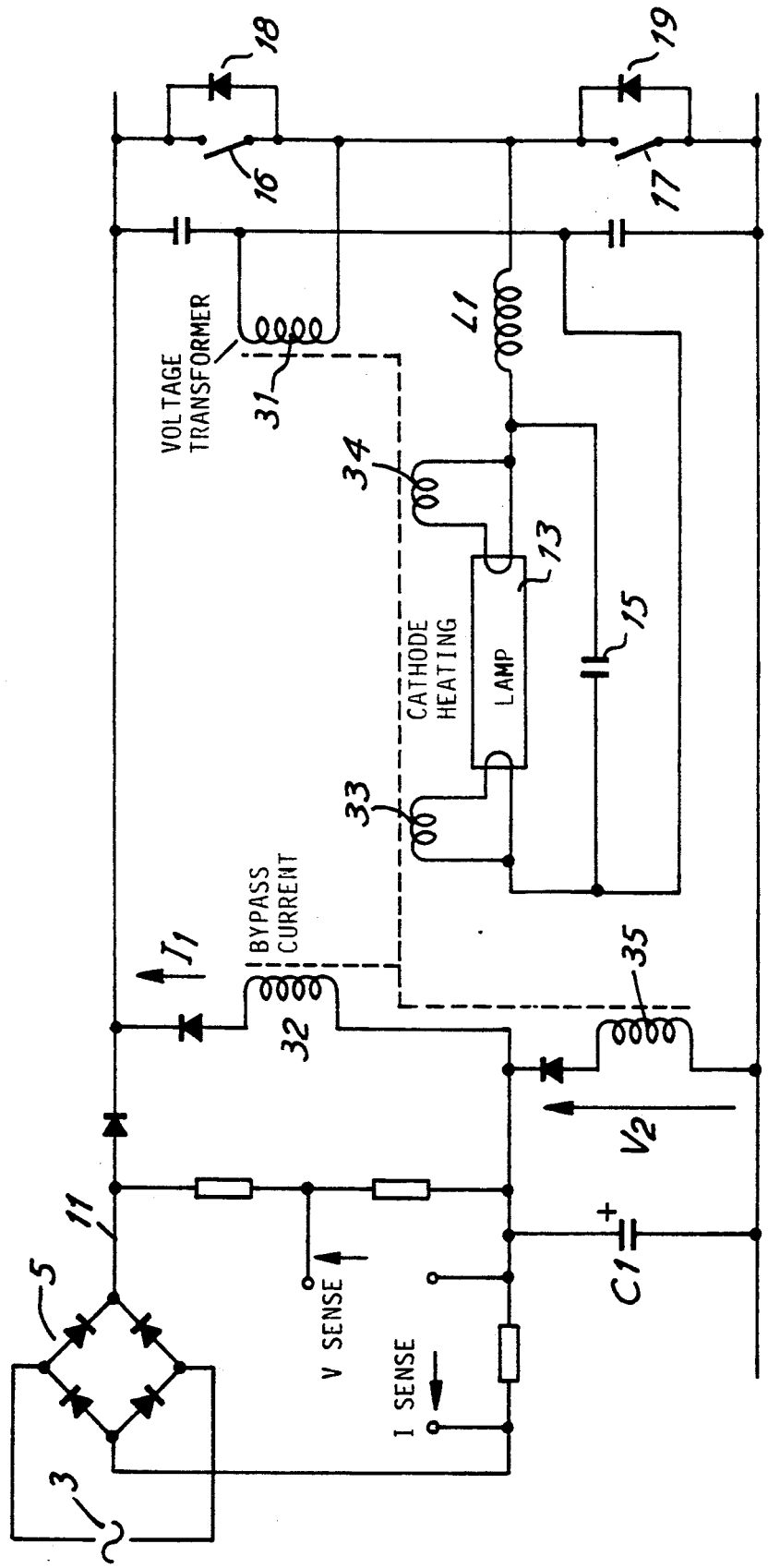
FIG. 3 is a schematic circuit diagram of a ballast circuit in accordance with the invention, being an adaptation of the circuit shown in FIG. 2.

Referring now also to FIG. 3, in the third circuit to be described in a voltage transformer 31 is introduced which is also driven from the inverter circuit 16, 17, 18, 19. A secondary coil 32 of this transformer 31 provides a path for the bypass current I1. This voltage transformer 31 also provides an isolated voltage for effecting cathode heating via further secondary coils 33, 34. A fourth secondary coil 35 of voltage transformer 31 is effective as a charge circuit and provides a well defined voltage V2 across C1. A fifth secondary coil (not shown) of voltage transformer 31 may be used to generate an isolated low voltage supply for control circuitry, such as that shown in FIG. 2b.

I claim:

1. A ballast circuit for the operation of a discharge lamp comprising:
    means for deriving a rectified AC voltage from a source of AC supply; a capacitive energy storage device and a load circuit in series across said source of rectified AC supply voltage;
    means for providing charge to the capacitive energy storage device from the load circuit in a potential so as to add to the potential from the output of said source of rectified AC supply voltage;
    and means for providing a first current path, including a current source, between the capacitive energy storage device and the load circuit, the current path bypassing said means for deriving a rectified AC voltage when the current drawn from the rectified supply approaches zero.

2. A circuit according to claim 1 further comprising a unidirectional device for preventing charging of the capacitive energy storage device in a direction so as to oppose the output voltage of said means for deriving a rectified AC voltage, the unidirectional device being in parallel with the capacitive energy storage device.

3. A circuit according to claim 1, further comprising a control circuit for maintaining the current from the supply in a similar wave shape to that of the output voltage from said source of rectified AC supply voltage, the control circuit including a first sense input in the return path to said source of rectified AC supply voltage and a second input for sensing a proportion of the output voltage of said means for deriving a rectified AC voltage.

4. A circuit according to claim 3 wherein the control circuit varies the switching frequency of said first and said second switching devices to control the operation of the circuit and the average current level in the discharge lamp.

5. A circuit according to claim 1 wherein the load circuit includes an inductance and said means for providing charge comprises a rectifying element in series with a secondary winding associated with said inductance.

6. A circuit according to claim 5, the load circuit including a positive and a negative supply rail, and a first and a second switching device connected in series between the positive and the negative supply rail wherein said inductance is positioned in a second current path from the midpoint of said first and second switching devices to one of said positive and said negative supply rails, said current path including a DC blocking device.

7. A circuit according to claim 6 wherein said inductance comprises an inductive coil which is the primary of a transformer.

8. A circuit according to claim 1 wherein said inductance comprises an inductive coil which is the primary of a transformer, and the transformer includes a secondary winding for providing the current source, said second secondary winding being connected in series with a unidirectional device and across the output of said means for deriving a rectified AC voltage.

9. A circuit according to claim 7 wherein the transformer includes further secondary windings for providing cathode heating to a discharge lamp.

10. A circuit according to claim 3 wherein said inductance comprises an inductive coil which is the primary of a transformer, and the transformer includes another secondary winding for providing a low voltage power supply to the control circuit.

11. A circuit according to claim 5 wherein said inductance comprises an inductive element forming part of a series resonant circuit in said load circuit, said series resonant circuit further comprising a resonating capacitor for connection across a discharge lamp.

12. A circuit according to claim 11 further comprising a control switching device for controlling the charging of the capacitive energy storage device, said control switching device being in series with said secondary winding.

13. A circuit according to claim 1 wherein the load circuit includes a positive and a negative supply rail, and a first and a second switching device connected in series between the positive and the negative supply rail wherein said inductance is positioned in a second current path from the midpoint of said first and second switching devices to one of said positive and said negative supply rails, said second current path including a DC blocking device, and said first current path comprises a capacitor and at least two rectifying diodes, said rectifying diodes being connected in series across said output of said means for deriving a rectified AC voltage and arranged to allow a positive current to flow in parallel to a current flowing through said means for deriving a rectified AC voltage, and the capacitor being connected from the midpoint of said rectifying diodes to the midpoint of said first and said second switching devices.

14. A circuit according to claim 7 wherein the return path for said inductive coil is the same return path as for a series resonant circuit in said load circuit.

* * * * *